(12) United States Patent
Ruess et al.

(10) Patent No.: US 8,531,811 B2
(45) Date of Patent: Sep. 10, 2013

(54) CLAMPING CONTROL CIRCUIT FOR HYBRID SURGE PROTECTION DEVICES

(75) Inventors: John Ruess, Farmington, UT (US); Gregory Hoepfner, Salt Lake City, UT (US)

(73) Assignee: Schneider Electric USA, Inc., Palatine, IL (US)

( * ) Notice: Subject to any disclaimer, the term of this patent is extended or adjusted under 35 U.S.C. 154(b) by 483 days.

(21) Appl. No.: 12/796,128

(22) Filed: Jun. 8, 2010

(65) Prior Publication Data

US 2011/0299203 A1 Dec. 8, 2011

(51) Int. Cl.
  *H02H 3/22* (2006.01)
  *H02H 1/00* (2006.01)
  *H02H 1/04* (2006.01)
  *H02H 9/06* (2006.01)
  *H01C 7/12* (2006.01)

(52) U.S. Cl.
  USPC ............................ 361/117; 111/118; 111/120

(58) Field of Classification Search
  USPC .................. 361/91.1, 111, 95, 117, 118, 120
  See application file for complete search history.

(56) References Cited

U.S. PATENT DOCUMENTS

| 4,912,589 A * | 3/1990 | Stolarczyk ...................... 361/56 |
| 5,500,782 A | 3/1996 | Oertel et al. |
| 6,226,166 B1 * | 5/2001 | Gumley et al. ............... 361/118 |
| 6,778,375 B1 | 8/2004 | Hoopes |
| 2005/0162801 A1 * | 7/2005 | Blasco Claret et al. ....... 361/118 |
| 2007/0201177 A1 * | 8/2007 | Kladar et al. .................. 361/118 |
| 2011/0026182 A1 * | 2/2011 | Buchanan et al. ............ 361/111 |

OTHER PUBLICATIONS

Schneider Solutions; Surgelogic SPDs; downloaded from http://surgelogic.com/products/secondary-surge-arrestor/; dated 2009; (1 page).

* cited by examiner

*Primary Examiner* — Rexford Barnie
*Assistant Examiner* — Christopher Clark
(74) *Attorney, Agent, or Firm* — Nixon Peabody LLP

(57) ABSTRACT

A hybrid surge protection device (SPD) having a clamping voltage that is controlled by precisely limiting the overshoot voltage of a gas discharge tube (GDT) in a hybrid suppression network. The suppression network is conventionally connected between a protected line carrying current from a power source to a load and a return connection. The network includes a main surge suppression varistor (VR1) connected in series with the GDT. A clamping control circuit in parallel with the network includes a voltage limiting device (VR2) in parallel with the GDT for preventing voltage overshoot by the GDT above a limiting voltage responsive to an occurrence on the protected line of a surge combination wave. The clamping control circuit also includes a capacitor (C1) connected in parallel with the VR1 providing a bypass path for electrical current and voltage potential to the GDT. Biasing resistors R1 and R2 can be connected in parallel to C1 and VR2, respectively, to distribute the voltage between the clamping control circuit and the network.

19 Claims, 2 Drawing Sheets

CLAMPING CONTROL CIRCUIT FOR HYBRID SURGE PROTECTION DEVICES

FIELD OF THE INVENTION

The present disclosure relates generally to surge protection devices (SPDs), and, more particularly, to a clamping control circuit for surge protection devices.

BACKGROUND

A hybrid surge protection device (SPD) offers both surge suppression and continued operation during an over-voltage condition yet providing a low clamping voltage and high surge current discharge capability.

BRIEF SUMMARY

Aspects of the present disclosure precisely limit and control the maximum voltage spike in a hybrid surge protection device (SPD) that incorporates a hybrid network of a GDT (Gas Discharge Tube) in series with a voltage-limiting varistor or other voltage limiting device. It does so by providing at least two key functions. First, the hybrid network reduces the maximum clamping voltage of a hybrid surge protection device (SPD) and prevents the voltage spike of the gas discharge tube (GDT) from being added to the clamping voltage of the voltage-limiting varistor or voltage limiting device. Second, it precisely controls the voltage across the GDT when the hybrid SPD is subjected to a voltage surge. A hybrid network using a GDT is desirable because it can prevent varistor failure during power system over-voltage conditions with little impact on the clamping level. The negative impact of the GDT voltage spike is removed by the clamping control circuit of the present disclosure.

The clamping control circuit accompanies a conventional hybrid surge protection circuit that includes a voltage-limiting varistor connected in series with a GDT. A capacitor (C1) is placed in parallel with a main surge suppression voltage-limiting varistor (VR1) and a second voltage-limiting varistor (VR2) (or other voltage limiting device) in parallel with the GDT. One, both, or no resistors, R1 and R2, can be connected in parallel with the capacitor C1 and the second varistor VR2, respectively, for biasing.

The SPD incorporating the clamping control circuit described herein improves the performance of an SPD with a hybrid circuit. Hybrid circuits are typically used where an alternating current (AC) power source employs a SPD and where the power source may experience a failure mode in which the voltage climbs considerably higher than the nominal power source voltage. The clamping control circuit of the present disclosure greatly improves the rated performance of a hybrid SPD by reducing the clamping voltage and therefore provides surge suppression to more sensitive equipment connected to the power source.

Benefits of the clamping control circuit disclosed herein include:

First, the maximum clamping voltage of the SPD is significantly reduced compared to a SPD without the clamping control circuit of the present disclosure. When exposed to a combination surge wave, the voltage and current required to turn on the GDT is encouraged by the low impedance of the capacitor. Prior art SPDs undesirably add the overshoot voltage spike of the GDT to the clamping voltage of the voltage-limiting varistor, raising the maximum clamping voltage.

Second, the maximum clamping voltage is considerably more consistent compared to prior-art SPDs without the clamping control circuit of the present disclosure. The voltage across the poles of the GDT is controlled by a parallel-connected voltage-limiting varistor that has a more consistent clamping characteristic. The maximum clamping voltage in prior-art SPDs is due, in part, by a GDT which generally has a highly variable and unpredictable voltage overshoot.

Third, the capacitor in prior-art SPDs is used as a filter and does not function to aid GDT "turn on." The clamping control circuit of the present disclosure uses the capacitor to initiate GDT "turn on" by bypassing the varistor VR1 to apply the surge voltage to the GDT without adding the voltage clamping value of the voltage-limiting varistor. A capacitor parallel to the clamping control circuit can be added for filtering noise.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1:
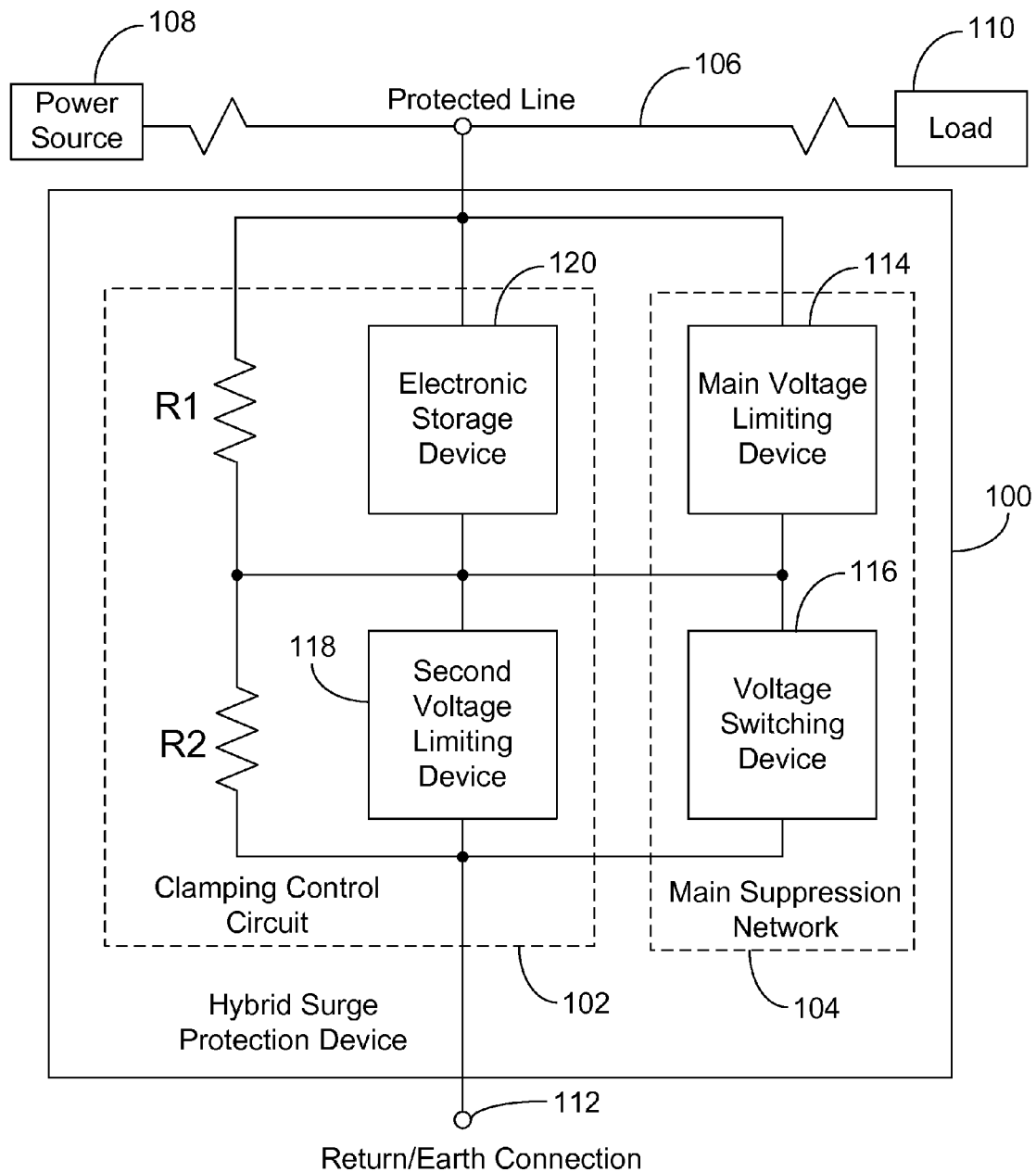
FIG. 1 is a functional block diagram of a hybrid surge protection device (SPD) having a clamping control circuit for controlling or reducing a maximum clamping voltage of the SPD.

FIG. 1 is a functional block diagram of a hybrid surge protection device (SPD) 100 having a clamping control circuit 102 for controlling or reducing a maximum clamping voltage of the SPD 100. Although a single exemplary main suppression network 104 is shown, the clamping control circuit 102 can also be incorporated in a SPD having multiple main suppression networks 104 connected together in parallel. The SPD 100 includes a main suppression network 104 connected between a protected line 106 carrying electrical current from a power source 108 to a load 110 and a return or earth ground connection 112. The return or earth ground connection 112 can be connected to earth (ground), to a neutral (return) line, or to another line, such as one carrying another phase of the electrical current. The SPD 100 limits the voltage between the power source 108 and the return 112 when there are unwanted high voltage spikes or surges on the power source 108. Basically, the SPD 100 limits the peak voltage from a surge wave and shunts the unwanted current away from the protected line 106.

A surge wave is an unwanted transient voltage above the voltage of the power source 108 that also contains related current energy. Due to the inductance, capacitance, and resistance of the installation wiring, the surge waveform voltage and current can be out of phase with respect to one another. The surge voltage waveform has a shorter rise time than the surge current waveform, and the current waveform also lags the voltage waveform as would be expected in a largely inductive system. The surge wave is typically referred to as a "combination wave" as set forth in IEEE C62.45-2002. This combination wave is a standardized waveform used to evaluate the performance or efficacy of the SPD 100 during testing in which the peak voltage is evaluated when the surge current is bypassed. The combination wave is used as an example, but the present disclosure is applicable to other surge waveforms.

The main suppression network 104 includes a main voltage limiting device 114 connected in series with a voltage switching device 116. The clamping control circuit 102 includes a second voltage limiting device 118 connected in parallel with the voltage switching device 116. The second voltage limiting device 118 prevents voltage overshoot by the voltage switching device 116 above the limiting voltage in response to an occurrence on the protected line 106 of a combination wave having a surge current waveform that lags a surge voltage waveform that exceeds the maximum clamping voltage of the SPD. The clamping control circuit 102 further includes an electronic storage device 120, such as a capacitor, connected in parallel with the main voltage limiting device 114. The storage device 120 provides a low-impedance bypass path for the electrical current from the protected line 106 applying the surge voltage to the voltage switching device 116.

The clamping control circuit 102 further includes a first resistor R1 connected in parallel with the electronic storage device 120 and a second resistor R2 connected in parallel with the second voltage limiting device 118. The first resistor R1 and the second resistor R2 have respective first and second values such that a ratio of the first value to the second value is proportional to a ratio of a first breakdown, breakover, or varistor voltage of the main voltage limiting device 114 to a second breakdown, breakover, or varistor voltage of the voltage switching device 116. In an implementation, the ratio of the first value to the second value is substantially equal to the ratio of the first voltage to the second voltage. The terms "breakdown voltage," "breakover voltage," "zener voltage," and "varistor voltage" have well understood meanings by those of ordinary skill in the art of surge protection devices or voltage limiting or clamping devices, and generally refer to the voltage at which the device begins to conduct a sufficient amount of current for the device to be considered turned on. For example, a voltage-limiting varistor voltage, $V_v$, refers to the voltage at which the varistor conducts one milliamp of DC current. The term "turn-on voltage" in connection with a voltage limiting or switching device herein can refer generically to any of a breakdown, breakover, zener, or varistor voltage.

In the example shown in FIG. 1, the capacity of the storage device 120 and the turn-on voltage of the second voltage limiting device 118 are selected such that the voltage across the storage device 120 and the second limiting device 118 is close to or less than the maximum clamping voltage. Further details about this relationship are described below in connection with FIG. 2.

The main voltage limiting device 114 can be, for example, a metal oxide varistor (MOV) having a varistor voltage, a selenium varistor having a varistor voltage, a zener diode having a zener voltage, an avalanche diode having a breakdown voltage, or a silicon avalanche diode having a breakdown voltage. Likewise, the second voltage limiting device 118 can be, for example, a metal oxide varistor (MOV) having a varistor voltage, a selenium varistor having a varistor voltage, a zener diode having a zener voltage, an avalanche diode having a breakdown voltage, or a silicon avalanche diode having a breakdown voltage. The main voltage limiting device 114 can include multiple voltage-limiting varistors connected in parallel to one another. The voltage switching device 116 can be, for example, a gas discharge tube (GDT) having a breakover voltage, a voltage regulator tube, a vacuum tube, or a spark gap having a breakdown voltage. The voltage switching device 116 can include multiple GDTs connected in parallel.

The storage device 120 can be a capacitor having a capacitance value that is selected such that the voltage across the storage device 120 and across the second voltage limiting device 118 responsive to the occurrence of the combination wave is close to or less than the voltage across the main suppression network 104 (with the voltage switching device 116 in the ON state) without the storage device 120 and without the second voltage limiting device 118. Details of how to select a suitable capacitance value for the storage device 120 are described more fully below.

Figure 2:
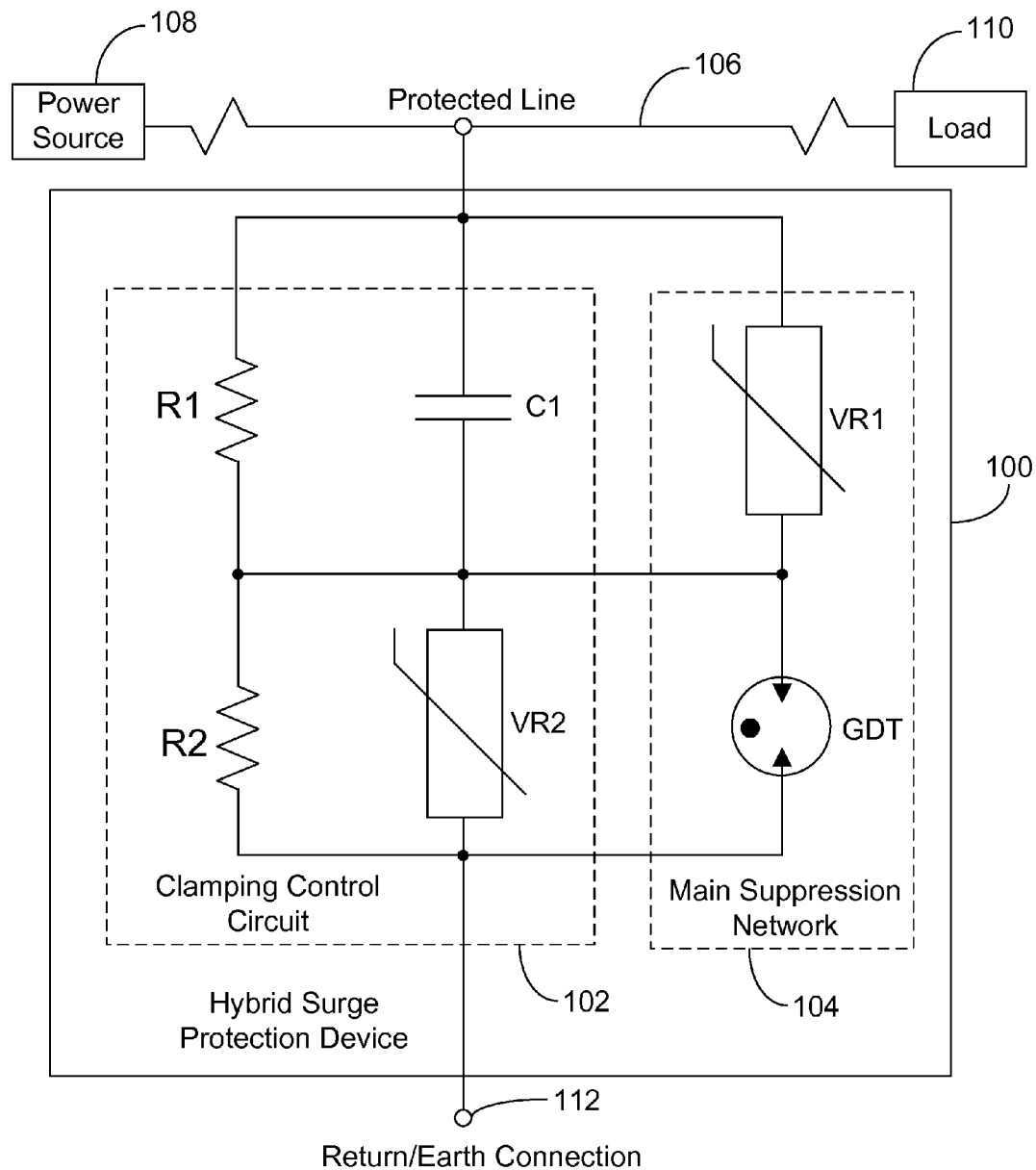
FIG. 2 is a functional block diagram of an SPD with particular, exemplary devices substituted for the functional blocks shown in FIG. 1.

Whereas FIG. 1 illustrates a general block diagram of a SPD 100, FIG. 2 illustrates a particular exemplary block diagram of the SPD 100 shown in FIG. 1. Here, the electronic storage device 120 shown in FIG. 1 is represented as a capacitor, C1, in FIG. 2. The main and second voltage limiting devices 114, 118 are correspondingly represented by a MOV, VR1, and a MOV or a silicon avalanche diode (SAD), VR2, respectively. The voltage switching device 116 is represented as a gas discharge tube GDT. As stated above, the present disclosure is not limited to these particular components shown, but rather any suitable components, such as those mentioned above, can be used in place of those shown in FIG. 2.

Still referring to FIG. 2, the GDT is normally in a high impedance state, designated as an "off-state." The GDT "off-state" voltage is typically selected so that the combination of the varistor voltage and the breakover voltage is greater than the anticipated over-voltage or full phase voltage of the power source 108. The voltage rating of a GDT refers to the "breakover voltage" required to break over the GDT (e.g., from the off- to an "on-" or conducting state) when presented with a relatively slow-rising direct current (DC) voltage potential. The turn-on (or breakover) voltage of a GDT occurs when the GDT reaches a low state of impedance during operation (typically 10V-30V potential on the poles of the GDT). Both voltage potential and charge are required to turn on a GDT. With a sufficient breakdown voltage potential and available charge, the GDT gas conventionally ionizes between the electrodes gap creating a low-impedance conduction path. When presented with a fast rising voltage wave, like a combination wave, a GDT will overshoot the turn-on voltage considerably. The overshoot duration is in the range of 1 µs for a typical 6 mm-by-8 mm GDT when subjected to a combination surge wave. This overshoot is undesirable because it adds to the maximum clamping voltage of the SPD 100. The clamping control circuit 102 controls this overshoot by eliminating or suppressing it.

A varistor, such as VR1 or VR2, has a significant nonlinear current-to-voltage characteristic, which is voltage-dependent. The resistance of the varistor, such VR1 or VR2, changes from high resistance to low resistance at the "varistor voltage" ($V_v$). Above the varistor voltage, the resistance of the varistor decreases exponentially allowing the conduction of large currents with a minimal increase of voltage above the varistor voltage. The varistor voltage can refer to the voltage at which the voltage-limiting varistor begins to conduct one milliamp of current.

A conventional hybrid SPD is shown as the main suppression network 104 and contains a voltage-limiting varistor VR1 in series with a GDT, connected between the power source 108 and the return and/or earth ground connection(s) 112. The SPD voltage-clamping performance, i.e., the limiting peak-voltage value and current shunting, is the sum of the varistor clamping voltage and the GDT turn-on voltage spike value. The clamping control circuit 102 added in parallel with the main suppression network 104 results in a voltage clamping value that is substantially the same value as just the varistor clamping voltage alone (i.e., in an SPD without the clamping control circuit 102) and removes the GDT voltage turn-on spike.

The capacitor C1 is connected parallel to the main suppression network 104 to provide charge and the surge voltage to the GDT. Because the front of a combination wave has a high frequency fundamental, the capacitor's low impedance passes the voltage surge signal of the combination wave to the GDT, creating a bias that results in most of the transient voltage potential's appearing on the GDT. The capacitor C1 is sized to provide charge to the GDT with a minimal voltage increase on the capacitor C1. In this role the capacitor C1 passes sufficient charge and the surge voltage to turn on the GDT (i.e., to exceed its breakover voltage) with much less voltage than the varistor network. The varistor VR2 limits the surge voltage across the GDT. The voltage across the capacitor C1 and the voltage limiting device VR2 should be close to or less than the maximum clamping voltage of the SPD 100. Without the capacitor C1 and the varistor VR2, the maximum clamping voltage of the SPD 100 is determined by the voltage across the varistor VR1 and the GDT. An objective is to add no further to the clamping voltage while maximizing the efficacy of having a GDT in the main suppression network 104. By adding the capacitor C1, it will apply the surge voltage to the GDT and bypass the varistor VR1 voltage drop due to the capacitor's lower impedance, without adding significantly to the maximum clamping voltage.

The clamping control circuit 102 limits the overshoot, or voltage spike, produced when the GDT is presented with the fast-rising voltage of a combination wave by placing a voltage-limiting varistor (or other voltage limiting device VR2) parallel to the GDT to clamp the voltage to a predefined level. Selecting the parallel-clamping voltage involves balancing between achieving a low maximum clamping voltage while providing sufficient voltage to turn on the GDT before the voltage-build across the capacitor C1 begins to impact the clamping voltage of the SPD 100 significantly.

If a simple hybrid circuit (shown as the main suppression network 104) without the clamping control circuit 102 is applied to a protected line 106, most of the line voltage would reside across the poles of the GDT because the impedance of the GDT is orders of magnitude greater than the voltage-limiting varistor VR1. With the clamping control circuit 102 added, a bias network distributes the voltage across the suppression voltage-limiting varistor VR1/capacitor C1 parallel combination and the GDT/varistor VR2 parallel combination so that the GDT does not turn on due to line voltage on the protected line 106 and a designed additional voltage above the nominal line voltage of the protected line 106. To create the bias, the clamping control circuit 102 can incorporate two resistors R1 and R2; R2 is parallel to the GDT network and R1 is parallel to the varistor network that is used to set the voltage bias between those portions of the circuit. An alternate method to establish the circuit bias is to use the impedance of the capacitor C1, the impedance of the varistor VR1, the impedance of the voltage limiting device VR2, the impedance of GDT, and optionally a combination of the resistors R1 and R2 to establish the biasing point.

The clamping control circuit 102 exploits the fact that the surge voltage waveform leads the surge current waveform, whereby the GDT is triggered to its low-impedance state before the voltage drop of the varistor VR1 rises due to the surge current being bypassed. The clamping control circuit 102 advantageously exploits the benefits of having a GDT without incurring the detriment of adding the negative impact of the GDT voltage spike.

Without the resistor R2, the impedance of the voltage limiting device VR2 and the impedance of the GDT are very high relative to the impedance of the capacitor C1, which has a relatively low impedance. Thus, practically all of the line voltage from the protected line 106 will be presented to the GDT, requiring the breakover voltage of the GDT to be much higher to prevent it from turning on while it sits on the protected line 106. The resistor R2 provides a low impedance path relative to the voltage limiting device VR2 and the GDT to distribute the voltage drop from the protected line 106 to the return connection 112 more evenly or to shift the voltage drop more to the varistor VR1. The resistor R2 effectively drops the voltage sitting on the GDT.

As an alternative to providing the resistor R1, the impedance of the capacitor C1 and R2 can be matched. However, the capacitor C1 shifts the phase of the voltage. Thus, the resistor R1 returns the voltage back in phase, allowing an equal voltage bias and thereby smaller values for the varistor VR1 and the GDT to be selected.

The varistor VR1 is selected so that it does not begin to conduct until the voltage on the protected line 106 swells to the allowable level, such as by more than 10%. For example, the varistor VR1 is selected so that it conducts only one milliamp of current (e.g., at its varistor voltage) when the voltage on the protected line 106 swells by 10% over its nominal value.

The GDT is selected in conjunction with the varistor VR1 so that the two components do not conduct until the voltage on the protected line 106 exceeds a desired over-voltage condition. For example, if the voltage on the protected line 106 is 120 Vac, and 120 Vac over-voltage is desired, the GDT and the varistor VR1 can stand off the voltage up to a full phase voltage of 240 Vac without beginning to conduct until the voltage exceeds the full phase voltage.

The selection of the capacitor C1, the voltage limiting device VR2, and the GDT are interrelated and requires a careful balancing of numerous competing considerations. The varistor voltage of the varistor VR2 can be selected to exceed the breakover voltage of the GDT. As the varistor voltage increases, the time required for the GDT to turn on decreases. The capacitor C1 shunts current during the time that the voltage climbs to a voltage where the varistor VR1 begins conducting. The capacitor C1 has to provide a sufficient charge to turn on the GDT at a voltage determined by the varistor VR2. As the breakover voltage of GDT increases, the varistor voltage of the varistor VR2 needs to be increased.

For example, if the capacitor C1 is too small, not enough current will be shunted through the capacitor C1 to turn on the GDT (e.g., exceed its breakover voltage), the capacitor C1 voltage will rise as the capacitor C1 charges to a point that the varistor VR1 will begin conduction, causing the excess current to bypass instead through the voltage limiting device VR1 resulting in a net increase in the clamping voltage caused by the additional GDT voltage. On the other hand, if the varistor VR2 is too small, even a large capacitance for the capacitor C1 may not be sufficient to turn on the GDT before the voltage on the capacitor C1 increases until the voltage-limiting VR1 conducts. The higher the varistor voltage of the voltage limiting device VR2 exceeds the breakover voltage across the GDT, the lower the capacitance of the capacitor C1 is needed. In short, the capacitor C1 allows a low impedance bypass of the varistor VR1 to turn on the GDT without the voltage that the varistor VR1 would add without the capacitor C1. The capacitor C1 operates as a "no cost" current bypass in that it achieves current bypass without the cost of adding additional voltage.

The capacitor C1 passes high frequency with low impedance, so the capacitance should be sufficient to shunt current to the GDT with minimal voltage buildup across the capacitor C1. The larger C1 is, the lower the voltage across C1. However, if the resistor R2 is selected too small, excessive current will leak through the return connection 112. To set the value of the capacitor C1, for a given VR2 and GDT, the capacitance can be selected so that the GDT turns on (e.g., reaches its breakover voltage) before the voltage on the capacitor C1 and the voltage limiting device VR2 exceeds the standalone voltage (i.e., the voltage in a circuit without the clamping control circuit 102) across the varistor VR1. As a function of the voltage, the time to turn-on the GDT varies. With a given voltage applied to the GDT, a minimum time is required to allow the GDT to turn on. During this period of time, there is a charge delivered to the surge suppression network. The capacitor C1 bypasses this charge around the varistor VR1, and as a function of time and current, the voltage across the capacitor C1 increases. Therefore, the capacitor C1 should be sized based on the function $C*V=i*t$, where C=capacitance, V=voltage, i=current, and t=time.

As mentioned above, voltage biasing is accomplished by selecting the values of the resistors R1 and R2 so that they are proportional to the turn-on voltages of the varistor VR1 and the GDT. In the case of the varistor VR1, the turn-on voltage is the varistor voltage, and in the case of the GDT, the turn-on voltage is the breakover voltage. For example, if the resistor R1 is equal to the resistor R2, the voltage will be split equally between the clamping control circuit 102 and the main suppression network 104. The values for R1 and R2 can be selected to shift most of the voltage drop across the resistor R1 by making the resistor R1 greater than the resistor R2, or selecting a value for the resistor R2 such that the voltage across the resistor R2 is much greater than the breakover voltage of the GDT.

If the values of the resistors R1 and R2 are selected to be too small, too much leakage current will leak from the protected line 106 to the return connection 112. These values should be selected to minimize the hybrid surge protection device (SPD) current leakage. The ratio of the resistors R1 to R2 is selected to define the proportion of the voltage across the varistor VR1 and the GDT in normal operating conditions. This ratio is adjusted to be the significant impedance relative to the reactive impedance of the capacitor C1 along with the varistor VR1 and the GDT; where a significant impedance can represent a couple of octaves or a decade on the logarithmic frequency scale. To err on the side of caution, more voltage may be dropped on the resistor R1 than the resistor R2 so that the varistor VR1 turns on before the GDT turns on. For example, if VR1 has a turn-on (varistor) voltage of 100V and the GDT has a turn-on (breakover) voltage of 100V, then R1>=R2. However, if the turn-on voltage for the GDT is only 50V instead of 100V, then R1:R2=VR1:GDT=2:1, so the value of the resistor R1 should be twice the value of the resistor R2.

In a specific, exemplary implementation, the following non-limiting values were found to be suitable for precisely controlling the maximum clamping voltage of the SPD 100 shown in FIG. 2. The AC rating of the protected line 106 is 150 Vac. The turn-on or varistor voltage of VR1 is 240V, and the varistor VR1 was selected to be a metal oxide varistor (MOV). The DC breakover voltage for the GDT is 230V. Thus, the ratio of the turn-on voltages of VR1 to GDT is approximately 1:1, which means that the ratio of the values for the resistors R1 and R2 should be 1:1. Thus, the value for the resistor R1 and for the resistor R2 was selected to be 18 kΩ. The capacitance for the capacitor C1 sufficient to cause the voltage across the capacitor C1 and the voltage limiting device VR2 to not exceed the voltage across the varistor VR1 in a standalone configuration without the clamping control circuit 102 was selected to be 0.022 μF. The voltage limiting device VR2 was selected to be a silicon avalanche diode (SAD) having a breakdown voltage of 510V.

Selecting these values can be an iterative, sequential process. However, the varistor VR1 can be selected for a desired maximum continuous operating voltage (MCOV), the GDT provides the level of over-voltage operation (e.g., based on a desired over-voltage value), the voltage limiting device VR2 can be selected to optimize the GDT turn-on time relative to the voltage applied, the capacitor C1 can be sized large enough to buy the time needed to turn on the GDT before the capacitor C1 voltage approaches the voltage of the varistor VR1 to prevent the GDT turn-on voltage from being added to the varistor VR1, and the resistors R1 and R2 provide a bypass for leakage currents and provide a bias voltage for sharing between the varistor VR1 and the GDT. Theoretically, the capacitor C1 can have a very large value limited only by the space available on the circuit board on which it is disposed.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A clamping control circuit for controlling or reducing a maximum clamping voltage of a surge protection device (SPD), the SPD including a main suppression network connected between a protected line carrying electrical current from a power source to a load and a return or earth ground connection, the main suppression network including a main voltage limiting device connected directly to a voltage switching device, the circuit comprising:
   a second voltage limiting device connected in parallel with the voltage switching device, the second voltage limiting device limiting voltage overshoot by the voltage switching device above its breakdown voltage responsive to an occurrence on the protected line of a combination wave having a surge current waveform that lags a surge voltage waveform that exceeds the maximum clamping voltage of the SPD; and
   a capacitor connected in parallel with the main voltage limiting device and directly connected to the second voltage limiting device, the capacitor providing a bypass path for electrical current and voltage potential to the voltage switching device.

2. The circuit of claim 1, further comprising a first resistor connected in parallel with the capacitor and a second resistor connected in parallel with the second voltage limiting device.

3. The circuit of claim 2, wherein the first resistor and the second resistor have respective first and second values such that a ratio of the first value to the second value is proportional to a ratio of a first breakdown, breakover, or varistor voltage of the main voltage limiting device to a second breakdown, breakover, or varistor voltage of the voltage switching device.

4. The circuit of claim 3, wherein the ratio of the first value to the second value is substantially equal to the ratio of the first voltage to the second voltage.

5. The circuit of claim 1, wherein the voltage across the capacitor and the second voltage limiting device does not exceed the maximum clamping voltage.

6. The circuit of claim 1,
wherein the main voltage limiting device is a varistor having a varistor voltage, a metal oxide varistor (MOV) having a varistor voltage, a selenium varistor having a varistor voltage, a zener diode having a zener voltage, an avalanche diode having a breakdown voltage, or a silicon avalanche diode having a breakdown voltage, and
wherein the second voltage limiting device is a varistor having a varistor voltage, a metal oxide varistor (MOV) having a varistor voltage, a selenium varistor having a varistor voltage, a zener diode having a zener voltage, an avalanche diode having a breakdown voltage, or a silicon avalanche diode having a breakdown voltage.

7. The circuit of claim 1, wherein the main voltage limiting device includes a plurality of varistors connected in parallel to one another.

8. The circuit of claim 1, wherein the capacitor has a capacitance value such that the voltage across the capacitor and the second voltage limiting device responsive to the occurrence of the combination wave is less than the voltage across the main voltage limiting device without the capacitor and without the second voltage limiting device.

9. The circuit of claim 1, wherein the voltage switching device is a gas discharge tube (GDT) having a breakover voltage, a voltage regulator tube, a vacuum tube, or a spark gap having a breakdown voltage.

10. The circuit of claim 1, wherein the main voltage limiting device is a main surge suppression varistor having a varistor voltage, wherein the voltage switching device is a gas discharge tube (GDT) having a breakover voltage, wherein the second voltage limiting device has a breakdown voltage, and wherein the voltage across the capacitor and the second voltage limiting device does not exceed the maximum clamping voltage, and wherein the capacitor has a capacitance value such that the voltage across the capacitor and the second voltage limiting device responsive to the occurrence of the combination wave is less than the voltage across the main surge suppression varistor without the capacitor and without the second voltage limiting device.

11. The circuit of claim 10, further comprising a first resistor connected in parallel with the capacitor and a second resistor connected in parallel with the second voltage limiting device.

12. The circuit of claim 11, wherein the first resistor and the second resistor have respective first and second values such that a ratio of the first value to the second value is proportional to a ratio of the varistor voltage of the main surge suppression varistor to a second breakdown, breakover, or varistor voltage of the voltage switching device.

13. The circuit of claim 12, wherein the second voltage limiting device is a silicon avalanche diode having a breakdown voltage.

14. A hybrid surge protection device (SPD), comprising:
a main suppression network connected between a protected line carrying electrical current from a power source to a load and a return or earth ground connection, the main suppression network including a main surge suppression varistor directly connected with a gas discharge tube (GDT);
a voltage limiting device connected in parallel with the GDT for preventing voltage overshoot by the GDT above a limiting voltage responsive to an occurrence on the protected line of a surge combination wave that exceeds the maximum clamping voltage of the SPD; and
a capacitor connected in parallel with the main surge suppression varistor and directly connected with the voltage limiting device, the capacitor providing a bypass path for electrical current and voltage potential to the voltage switching device.

15. The SPD of claim 14, further comprising a first resistor connected in parallel with the capacitor and a second resistor connected in parallel with the voltage limiting device.

16. The SPD of claim 15, wherein the first resistor and the second resistor have respective first and second values such that a ratio of the first value to the second value is proportional to a ratio of a varistor voltage of the main surge suppression varistor to a second breakdown, breakover, or varistor voltage of the voltage switching device.

17. The SPD of claim 14, wherein the voltage across the capacitor and the voltage limiting device does not exceed the maximum clamping voltage.

18. The SPD of claim 14, wherein the voltage limiting device is a silicon avalanche diode having a breakdown voltage.

19. The SPD of claim 14, wherein the capacitor has a capacitance value such that the voltage across the capacitor and the voltage limiting device responsive to the occurrence of the combination wave is less than the voltage across the main surge suppression varistor without the capacitor and without the voltage limiting device.

\* \* \* \* \*